(12) United States Patent
Joncourt (10) Patent No.: US 7,175,188 B2
(45) Date of Patent: Feb. 13, 2007

(54) DEVICE FOR TRANSPORTING A LOAD AND SUITABLE ATTACHING DEVICE

(76) Inventor: Francois Joncourt, Lindenweg 81, Wabern (CH) CH-3084

(*) Notice: Subject to any disclaimer, the term of this patent is extended or adjusted under 35 U.S.C. 154(b) by 296 days.

(21) Appl. No.: 10/801,036

(22) Filed: Mar. 16, 2004

(65) Prior Publication Data

US 2004/0183263 A1 Sep. 23, 2004

(30) Foreign Application Priority Data

Mar. 18, 2003 (EP) .................................. 03405186

(51) Int. Cl.
*B62B 1/00* (2006.01)
(52) U.S. Cl. ............................... 280/47.17; 280/47.41; 280/652; 280/645
(58) Field of Classification Search ............ 280/47.17, 280/47.3, 47.41, 652, 645
See application file for complete search history.

(56) References Cited

U.S. PATENT DOCUMENTS

| | | | | |
|---|---|---|---|---|
| 1,623,321 A | * | 4/1927 | Smith et al. | 172/354 |
| 2,593,944 A | * | 4/1952 | Walters, Jr. et al. | 172/246 |
| 2,660,446 A | * | 11/1953 | Edhardt | 280/653 |
| 2,672,348 A | * | 3/1954 | Scott | 280/653 |
| 3,743,312 A | * | 7/1973 | Gibbons | 280/47.18 |
| 4,564,203 A | * | 1/1986 | Wilson | 280/47.32 |
| 5,901,968 A | * | 5/1999 | Niedersteiner | 280/1.5 |
| 6,139,033 A | * | 10/2000 | Western | 280/47.23 |
| 6,631,777 B1 | * | 10/2003 | Thompson | 180/180 |

FOREIGN PATENT DOCUMENTS

| | | |
|---|---|---|
| CA | 1 185 937 | 4/1985 |
| DE | 723 375 | 5/1938 |
| DE | 42 02 135 A1 | 7/1993 |
| DE | 297 10 339 U1 | 9/1997 |
| EP | 0 719 511 A1 | 7/1996 |
| FR | 2 775 878 | 9/1999 |
| FR | 2 817 717 | 6/2002 |
| WO | WO 01/24655 A1 | 4/2001 |

* cited by examiner

*Primary Examiner*—J. Allen Shriver
*Assistant Examiner*—Cynthia F. Collado
(74) *Attorney, Agent, or Firm*—Young & Thompson (57) ABSTRACT

Device for transporting a load comprises a chassis including two longitudinal girders crossing each other so as to form the general shape of an asymmetrical X, the height of the V of the upper portion being equal to N times the height of the V of the lower portion (e.g. N=3). A device for support on the ground is arranged at the lower end of the lower V. while the ends of the legs of the upper V comprise handles. Braces are provided to ensure a parallelism between an axis of a supporting element of the support device, and a straight line connecting the ends of the handles. The load is placed at least partially on a seat formed by two cross members that are arranged on either side of the crossing point of the longitudinal girders.

23 Claims, 8 Drawing Sheets

DEVICE FOR TRANSPORTING A LOAD AND SUITABLE ATTACHING DEVICE

FIELD OF THE INVENTION

The present invention refers to a device for transporting a load, comprising a chassis having a lower end and an upper end, the latter having a device for its support on the ground, composed of at least one element including at least one element for support on the ground, said chassis being connectable to a user by means of an attaching device.

The device may be pulled or possibly pushed by an user directly while holding it by means of handles, or indirectly, the user being connected to the transport device through a suitable attaching device comprising a belt and intended to be worn by the user, said device being provided with means for connecting it to the device for transporting a load.

BACKGROUND OF THE INVENTION

It is generally known that a person carrying loads on his or her back—especially if such transports are frequent and/or prolonged and if the loads are moreover heavy and/or relatively large—is liable, at least in the long term, to more or less serious back problems or even to irreversible injuries. Therefore, on one hand, suitcases including a device comprising at least one roller and a handle or a similar means, and on the other hand (in the field in which the present invention is more particularly situated), devices for transporting loads that are more specifically conceived for hikers have appeared on the market, whose common goal it is to relieve one's back through a substantial reduction of the effort required for the transport of the aforesaid loads and to make especially hikers unaware of the strain of carrying a burden.

The main problem of this kind of transport devices is in the comfort and the ease of use. This essential requirement implies that the transport device should be simple and light in construction and quick and easy to assemble and disassemble, all without compromising its reliability. In addition, its selling price should remain affordable, which requires a rational and inexpensive manufacture, while the materials of its components should be of high quality. The problem is therefore all the more difficult to solve as it appears polymorphous in the sense that it includes a series of components constituting each a subproblem, and a partial solution of a subproblem may be a hindrance for a partial solution of another component of the problem. Thus, for example, it is apparent that the lighter the frame, the easier the device will be to handle, to carry and to pull. Yet, on the other hand, it is important for the frame to be stable and rigid. However, while a reinforcement of the frame particularly serves the aim of increasing the stability and rigidity, it results in an increase in weight, whereas the selection of certain light materials confronts the manufacturer with costs that may rapidly become prohibitive. In analysis, these antagonisms are subordinated to a condition sine qua non for a high comfort in use, namely that of the equilibrium and the stability of the device when it is being pulled or maneuvered in any other way. It is therefore fundamental to provide an optimal equilibrium (the stability being indeed a result of the latter).

Ultimately, the user wants a device of this kind to be as polyvalent as possible, i.e. applicable both in difficult terrain (more or less steep trails and paths that are hardly or not passable for cars) and in flat or paved terrain (suburbs, train stations etc.).

It is easily understood that the problem arising with respect to the attaching device that the user may employ for pulling or pushing the transport device is quite analogous to what has been said in regard of the latter. In fact, on the ergonomic level, firstly, a comfortable use of the attaching device must be ensured, and care must be taken to relieve the back through a substantial reduction and an ideal distribution of the efforts furnished in the transport of a load. Secondly, according to a more technical aspect, the attaching device must be designed such that its application is practical and rational. Ultimately, a third aspect consists in combining the esthetic aspect with the two others, the ergonomic and the technical aspect, rather than sacrificing it to them.

Different kinds of devices for transporting burdens are currently available, as well as different attaching devices ranging from a simple belt to a complex harness.

French patent application FR-A-2,775,878 discloses a transport device and an attaching device. The transport device is in the form of a frame composed of two longitudinal laths extending symmetrically with respect to a median plane, of one or a plurality of reinforcing cross members and of a supporting brace. The lower ends are brought nearer together to another in order to be spaced apart only a small distance and are interconnected by a device providing support on the ground, e.g. a shaft provided with a wheel, and whose plane coincides with the mentioned median plane. These laths separate toward their upper ends, each of which comprises a supporting piece intended to rest on the hips of the carrier, the two pieces being connected to each other by a belt.

The load, placed on the supporting brace, is provided with shoulder straps passing over the shoulders of the carrier. The latter are thus relieved of a large part of the load's weight, the latter being distributed on the wheel and on the hips. However, the advantage is counteracted by a substantial drawback, since the hips will be continuously subject to a double stress in the vertical (part of the load's weight resting on the hips) and lateral directions (caused by pitching the device). A reduction of one of the two stresses as a result of shifting the load in a horizontal plane, i.e. of a modification of the location of the supporting brace, will cause a corresponding increase of the other stress.

The applications of these transport and attaching devices are extremely limited, and the rigidity particularly of the transport device appears to be rather mediocre and, most importantly, its stability and equilibrium are not ensured for the reasons exposed below.

U.S. Pat. No. 4,664,395 discloses a device for transporting a load comprising a carriage or support chassis and a harness. The chassis is formed of two longitudinal bars and of a plurality of cross members and is provided with a pair of foldable legs. The bars converge at their lower ends, near which a wheel equipped with brakes is arranged. As to the harness, it is composed of a lower and upper belt, disposed around the waist and the chest, respectively, and a pair of suspenders, on one hand, and on the other hand, of a dorsal structure formed of two tubes. The harness further comprises specifically a holster or more generally an attachment for receiving a brake handle similar to that of a bicycle, the handle being connected to the wheel or more precisely to a slottet jaw for a brake linings via a cable passing over the user's shoulder. Connected to this dorsal structure are the two aforementioned belts, on one hand, and on the other hand, in its upper area, the upper ends of the chassis of the transport device.

Particularly the harness is quite complex and heavy, and therefore clumsy but also unaesthetic, and wearing it seems at the least awkward as it rather resembles a pillory, such that the user will rapidly abandon it and thus the entire transport device. Also, the very conception of the latter is such that both its equilibrium in use and its rigidity are insufficient.

These two references have at least one characteristic in common—which accounts at least partially for the lack of stability and of equilibrium of the devices disclosed therein—namely the fact that the laths or bars respectively of the chassis, possibly connected to each other by at least one cross member, extend on either side of a median plane to converge at their lower ends, between which the member for providing support on the ground is mounted. Moreover, the transport device and attaching device are rigidly connected to each other.

Thus, the exposed problem, or rather the array of problems set forth above remains unsolved, both with regard to the transport device and the attaching device.

SUMMARY OF THE INVENTION

The object of the present invention is to provide a solution that is really efficient and optimal and at the same time very elegant and attractive, thereby eliminating all the disadvantages from which the devices of the prior art are suffering.

This object is attained by a device for transporting a load wherein said chassis is composed of a lower portion and an upper portion forming, as seen in a plan view, at least approximately the shape of a V, wherein the legs of the V of each of said portions converge to join or cross each other in an area where they are connected to each other, on one hand, and on the other hand, extend to open at least over a certain distance, opposite each other, all or part of said load being intended to be placed in said area, and wherein the ratio $H_1/H_2$ of the heights of the V of the lower portion and the upper portion, respectively, is equal to a defined value N, and by an attaching device wherein said means allow said transport device a liberty of movement of a limited amplitude in the course and in the axis of walking.

The conception of the transport device and, consequentially, that of the attaching device, and the subsequent translation of these concepts into both efficient and simple technical means, are the outcome of an analysis and of a synthesis of the sum of conditions—namely: equilibrium and stability, light weight and solidity, rigidity and ease of handling, polyvalence, costs and esthetic—, all of which must be fulfilled as they are all inherent to the object of ensuring an ideal comfort in use. Due to its structure, the transport device of the invention ensures an optimum equilibrium, particularly because of the crossing of the lines of force which are ideally distributed; it combines solidity and light weight, rigidity and flexibility, efficiency and simple manufacture, ease of use and esthetic.

As to the attaching device, the latter is designed such that a tipping of the transport device, if the risk occurs, can be avoided on principle, even in situations involving a rotation or a swinging motion of the carrier's trunk. Likewise, a tendency to swing, i.e. a forward and backward movement during walking, is almost eliminated, or the amplitude of such a movement will at least remain extremely limited in the worst case. Moreover, the attaching device allows the user to keep his hands free in many situations. Of course, while walking in rugged terrain, the user may still take hold of the handles of the device to be ready to neutralize a possible disturbing force at any time. However, this will not cause the least discomfort since it will be sufficient to impart a slight upward or downward impulse to the handles of the device. On one hand, the major component of the force created by the weight of the transported load is taken up by the element supporting the transport device on the ground, whereas the other component of the force is substantially reduced (which is common to all the devices of the prior art). The latter, like all residual components of possible additional forces caused e.g. by shocks or other sudden variations in the terrain, are distributed substantially equally on the left and on the right of the user, more specifically on the hips (to a lesser degree on the shoulders, depending of the embodiment of the attaching device), i.e. without straining the spine, or only very slightly. Finally, it has been found to be of the greatest interest that the carriage, rather than being fixed or rigidly attached to the body of the carrier (as is the case with the harnesses of the prior art), conserves some liberty of movement, i.e. a floating capacity with respect to the carrier, however limited, of course, due to the conception and the constructive particularities of the elements constituting the attaching device. However, in the very numerous practical applications of this device (particularly cross-country hiking), it has been observed—which is not unrelated to the encountered commercial success—that the carriage, in spite of this "floating" attachment, constantly remains relatively motionless with respect to the wearer during walking, the tendency to a forward motion being immediately neutralized by the tendency to a backward motion and vice versa.

Thus, the devices of the invention offer a palette of advantages that have been proven in numerous tests. It fulfills the most stringent demands of hikers but also addresses a wide public to whom it may be offered at a relatively modest price while distinguishing itself by a very advantageous quality/price ratio.

BRIEF DESCRIPTION OF THE DRAWINGS

Hereinafter, by way of non-limiting examples, on one hand, a first embodiment of the transport device with different alternative embodiments as well as a second embodiment of the device, and on the other hand, two embodiments of the attaching device will be described with reference to the drawings, where.

DETAILED DESCRIPTION OF PREFERRED EMBODIMENTS

In a general manner (see FIGS. 1 to 4), the chassis of transport device 1, hereinafter called carriage 1—projected in a plane $P_H$ that will be considered by convention as being the plane containing it globally—is in the general form of a crossed structure composed of a lower portion 2 and an upper portion 3, each in the form of a V. These portions are connected to each other in an area where the legs of each V converge or cross each other, in this case in a crossing point 4 constituting the common apex of the two V's, whereas the two legs of each V open and diverge (still in the mentioned plane $P_H$) on both sides of a plane $P_V$ extending orthogonally to plane $P_H$, to form, in this example, an X that is asymmetrical with respect to the latter plane. The dimensions of portions 2, 3, i.e. of the corresponding V's, are defined by the heights $H_1$ and $H_2$ ($H_2$ being preferably greater than $H_1$), as well as by the angles $\alpha$ and $\beta$, these two angles preferably being equal to each other (FIG. 4).

Figure 1:
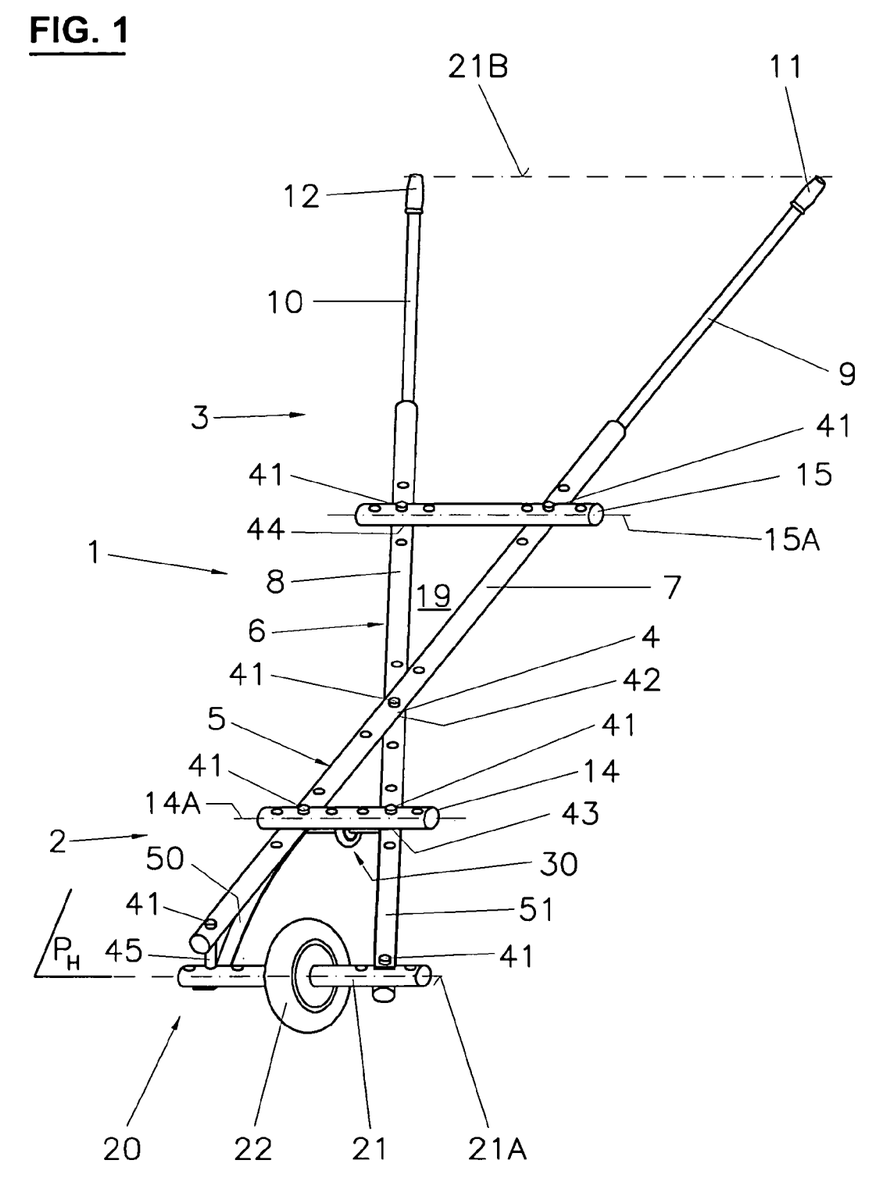
FIG. 1 is a perspective view of a first embodiment of the transport device.
Figure 2:
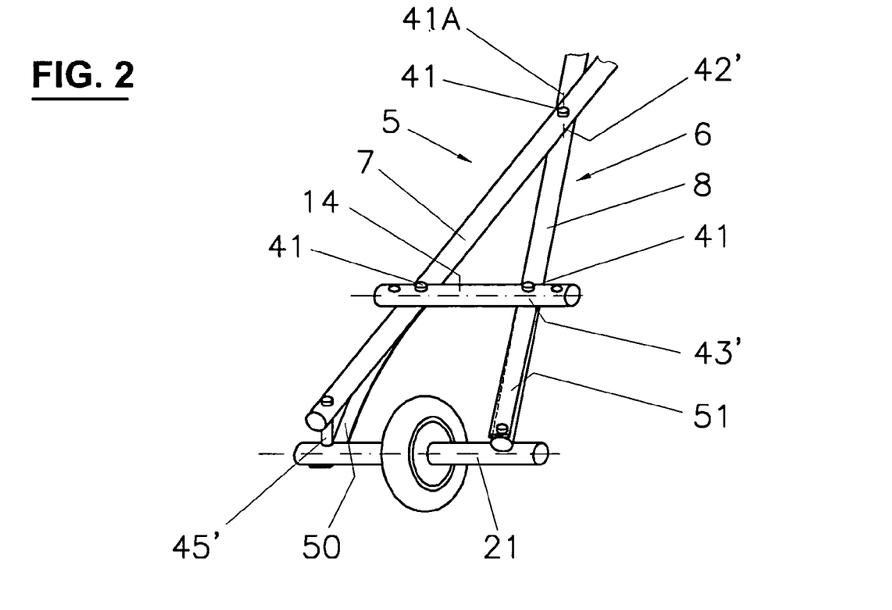
FIG. 2 is a partial perspective view showing an alternative embodiment of the device of FIG. 1.

More particularly, in a preferred embodiment represented in a perspective view in FIGS. 1 and 2 (see also the different views of FIGS. 3 and 4), the chassis of carriage 1 comprises two longitudinal girders 5, 6 extending above/underneath one another and connected to each other by a fastening member 41 whose axis 41A corresponds at least approximately to the intersecting line of plane $P_V$ with a plane $P_M$, the latter being a median or bisected plane of portions 2, 3. By definition, this axis 41A contains point 4, i.e. the intersection of the three planes $P_H$, $P_V$, and $P_M$ and crossing point and, depending on the construction, the mutual contact point of the longitudinal girders. These girders are preferably composed of tubes 7, 8 and of telescopic members 9, 10 which adjustably prolongate the arms of upper portion 3 and whose ends are provided with handles 11, 12. Thus, the carriage is undeformable while connecting member 41 in axis 41A is subject to minimal stresses since at this crossing point, the structure is reinforced by the superimposed girders which absorb the stresses.

It will be noted here that for the sake of simplicity, the fastening members (e.g. screw and nut assemblies) used in carriage 1 and mentioned in the present description are all designated by the same numeral 41 (unless otherwise specified) although the screws are not necessarily all of the same length for constructive (number and dimensions of the elements to be connected) and functional reasons (compliance with parallelism) that will be discussed below.

On both sides of point 4, with respect to plane $P_V$, cross members 14, 15 extending in axis 14A, 15A, respectively, are mounted and fastened to tubes 7, 8 by fastening means 41. These cross members serve a double function in that they ensure a more rigid structure and simultaneously constitute, together with a portion of tubes 7, 8 which they delimit in the crossing zone, a seat or area of support 19 for a load 16. [Note: the term delimitation is not to be understood in the strict sense; the load may of course extend beyond cross members 14, 15 or inversely occupy only a part of area 19]. In any case, the load will be placed in this crossing zone of portions 2, 3, which is particularly undeformable and rigid.

Figure 3:
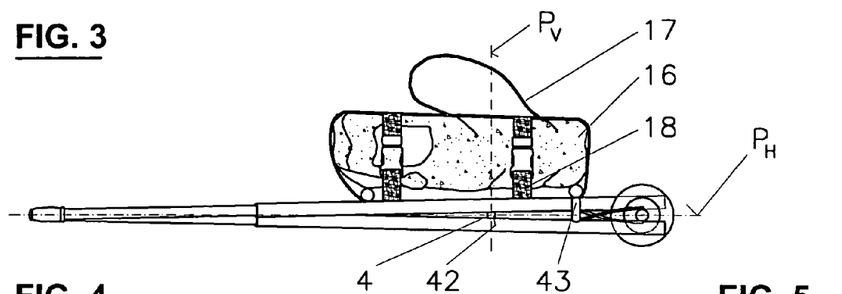
FIGS. 3, 4, and 5 are side, bottom, and front views, respectively, of the transport device of FIG. 1 with another variant.
Figure 4:
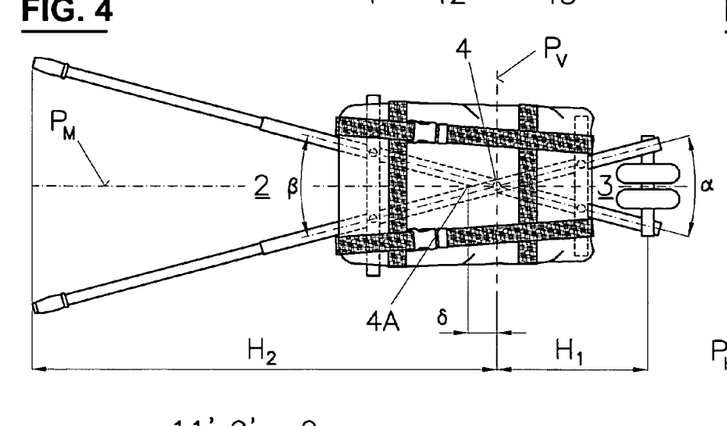
Figure 5:
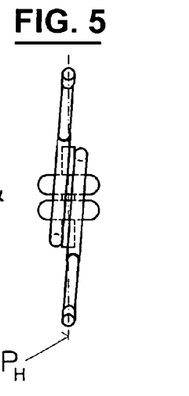
Figure 6:
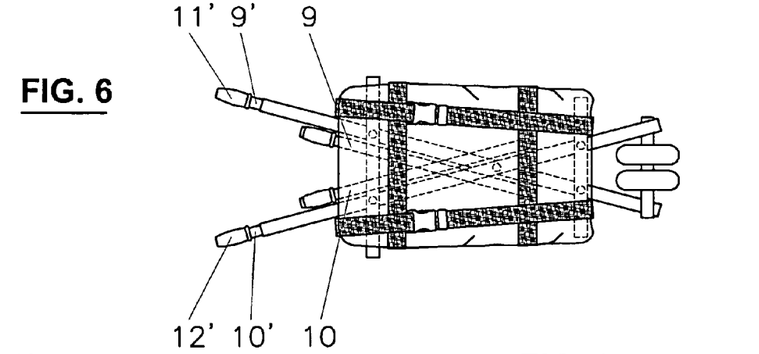
FIG. 6 is a view in analogy to FIG. 4 showing a particularity of the transport device, FIGS. 7 and 8 schematically show variants of the device for supporting the transport device on the ground.

In FIGS. 3, 4, and 6, load 16 is represented in the different figures as a backpack provided with straps 17 and fastened to the chassis by means of straps 18 (see especially FIG. 3).

Figure 2A:
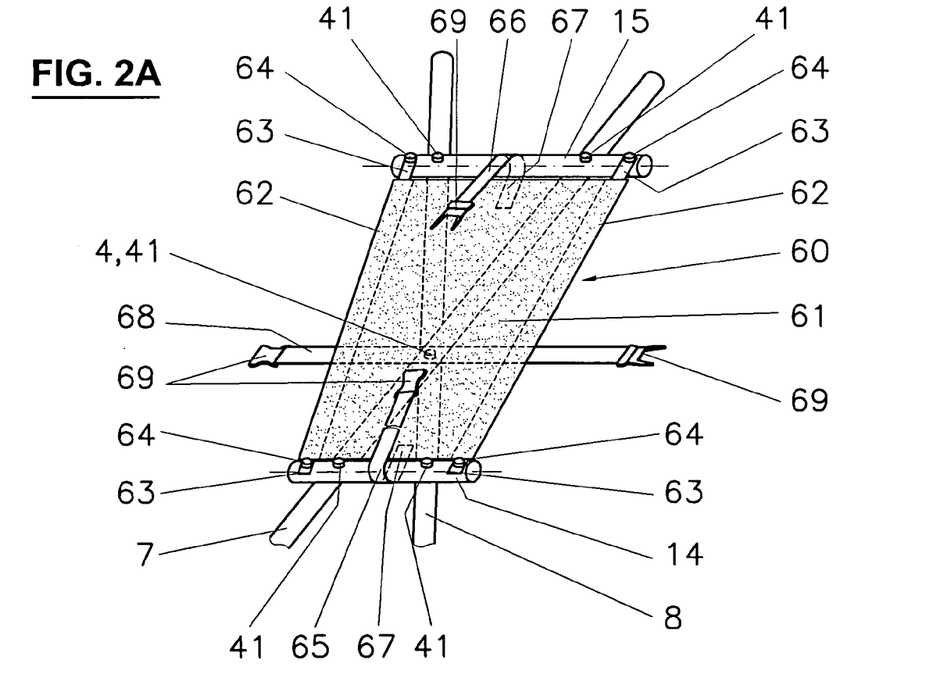
FIG. 2A shows a rack suitable for mounting on the transport device.

In an interesting variant, the load is rapidly and easily attachable to the rack by a simple set of crossed straps, see FIG. 2A. In fact, cross members 14, 15 allow the attachment of a rack, generally designated by 60. The rack comprises a trapezoid cloth 61 with reinforced edges 62 and whose four corners are provided with tabs 68 allowing its attachment to the cross members by means of fastening members 64. The load is attached to the rack by three straps. On one hand, straps 65, 66 are fastened on and under cloth 61 by tabs 67. Straps 65, 66 partially surround cross members 14, 15, respectively, and are disposed in the direction of plane $P_M$. On the other hand, a strap 68 extends in the direction of plane $P_V$, i.e. orthogonally to straps 65, 66, and is fastened to carriage 1 by central fastening member 41. Thus, strap 68 passes under the structure of the carriage to be folded over edges 62 of cloth 61. The ends of the straps are provided with tensioning strap buckles 69.

In the end section of lower portion 2, the device for support on the ground is arranged, generally referenced by 20. The ends of the legs of the V of this portion 2 are connected to each other by a supporting element 21 consisting of an axle shaft 21A with a wheel 22 mounted thereon, the shaft extending above tube 8 and underneath tube 7. In a variant represented in FIG. 2, shaft 21 extends above both tubes 7 and 8. A protecting and reinforcing strip 50 extends under the part of tube 7 between cross member 14 and the lower end of the tube and also under shaft 21. It is connected to tube 7 and shaft 21 by fastening means 41. A protecting and reinforcing strip 51 is disposed in an analogous manner above the part of tube 8 between cross member 14 and the lower end of the tube and connected to shaft 21 from above. It is connected to the latter and to tube 8 by fastening means 41. Strip 51 also provides a better esthetic if a brace 43; 43' is provided (FIGS. 1 and 2, see below).

Figure 7:
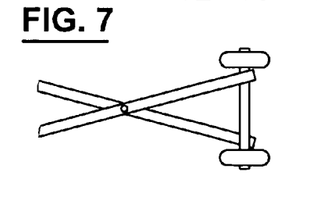
Figure 8:
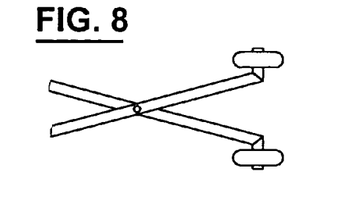

Supporting device 20 may be realized in different variants. In particular, more than one wheel may be provided, as appears in FIGS. 3 through 8 where the device comprises two wheels arranged either inside the legs of the V of lower portion 2 (FIGS. 3 to 6) or on the outside of these legs (FIGS. 7 and 8). Besides, in place of the wheel or wheels, it is possible to mount at least one support element of another kind, such as a ski.

Figure 15:
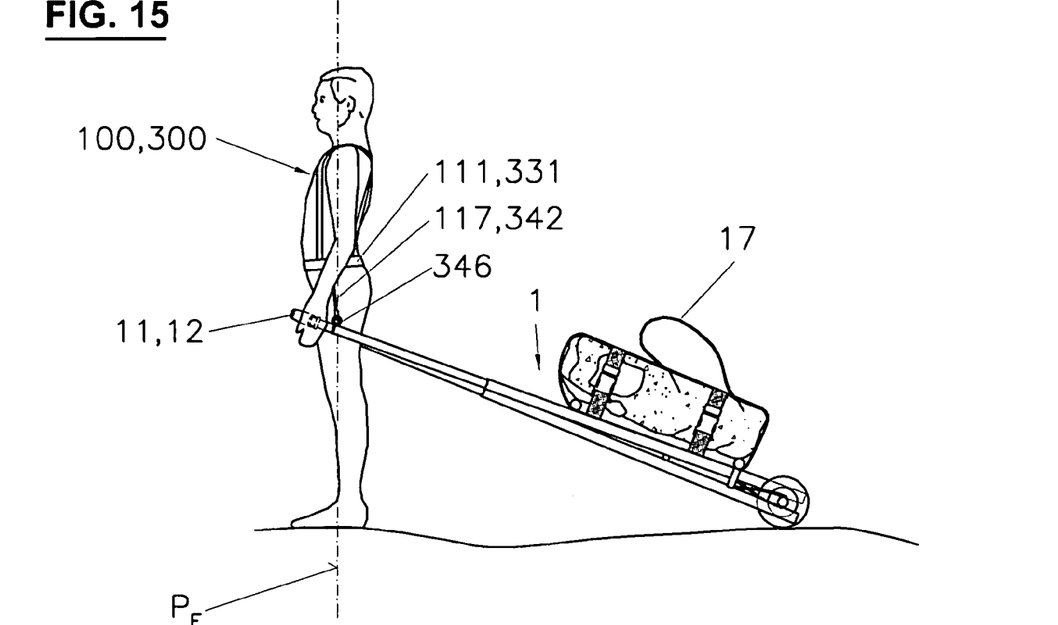
FIG. 15 is a side view of an user equipped with the attaching device and the transport device connected thereto.

Also, the question regarding the best geometrical location of crossing point 4 arises. In fact, the location of this point is the result of a compromise between the desire to best avoid any tipping risk of the carriage, on one hand, and on the other hand, to best relieve the user of the weight of the transported load. In use (as represented in FIG. 15) and assuming a correct attachment of load 16, i.e. in area 19 (possibly on rack 60) and advantageously as concentrated as possible on and around the location of the crossing of the girders, the resultant of the force created by the load will be contained in plane $P_M$ and will pass at least near point 4, for example through a point 4A situated at a distance $\delta$ from point 4 (FIG. 4). Various tests have shown that $H_1$ and $H_2$ are advantageously chosen such that their ratio $H_1/H_2$ is situated within a range of values [0.25–0.35]. As a practical example, $H_1$ and $H_2$ may be approximately 0.40 m and 1.40 m, respectively. Regarding the distance between handles 11, 12 (a segment of straight line 21B, which will be discussed below) of upper portion 3, of course, it will in any event be chosen such that the handles are situated on the right and on the left of the user in the position shown in FIG. 15 without causing the least discomfort (distance in the order of 0.60 m, i.e. a little larger than the average width of a person's hips). According to a constructive variant, additional bores are provided (see FIG. 1, where they are schematized but not referenced) in order to be able to individually adjust the parameters $H_1$, $H_2$, α, β (in practice, when applying the numerical example indicated above, a value in the order of some twenty degrees will result for angles α, β, while α=β).

For optimum equilibrium and comfort in use, it is suitable that at least two straight lines, namely an imaginary straight line 21B (FIG. 1) passing through the (non-referenced) centers of the ends of upper portion 3 and axis 21A of shaft 21, remain parallel, these parallel lines forming the above-mentioned plane $P_H$. Yet, due to the crossed arrangement of the girders of the chassis, and in view of the constructive characteristics and numerous possible variants—heights $H_1$, $H_2$, angles α and β, diameters of tubes 7, 8, diameter of shaft 21, disposition of the latter with respect to the ends of lower portion 2 of tubes 7, 8 (i.e. either above and underneath the tubes, or on the same side, underneath or above them)—, a lack of parallelism should be corrected by all suitable means. In the present case, these means are constituted by braces of defined and adapted sizes, each disposed in a suitable location where two given elements of the chassis structure are interconnected, the dimensions of the braces themselves depending on the mentioned constructive characteristics and variants. The effect of these means is twofold since besides the fact that they allow to obtain the above-mentioned parallelism and thereby contribute to perfecting the equilibrium of the carriage, they make the assembly of the latter substantially easier. For illustrative purposes, in the example represented in FIG. 1, braces 42, 43, 44, and 45 are referenced; they are inserted between tubes 7 and 8 at the crossing 4 thereof, between tube 8 and cross member 14, between tube 8 and cross member 15 and finally between tube 7 and shaft 21, respectively. Analogously, braces 42', 43', and 45' are shown in the example of FIG. 2. At the same time, these braces ensure a parallelism between the axes 14A and 15A of cross members 14, 15, respectively.

Advantageously, in the described embodiment, extensible elements 9, 11 may be stored in support area 19 (see FIG. 6), and short elements 9', 10'comprising handles 11', 12' can be inserted in the upper ends of tubes 7, 8 in place of the extensible elements. In this manner, the carriage can be advantageously used while traveling, in train stations, in town, etc.

Figure 9:
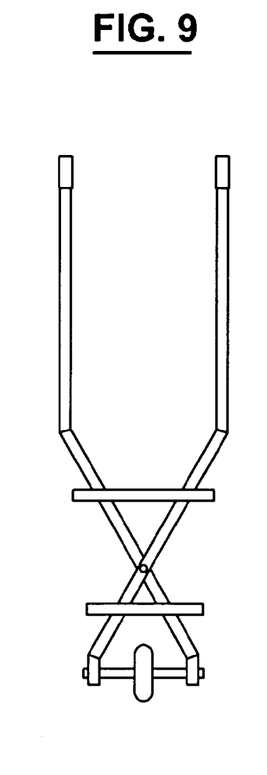
FIGS. 9 and 10 represent other variants of the first embodiment of the transport device.
Figure 10:
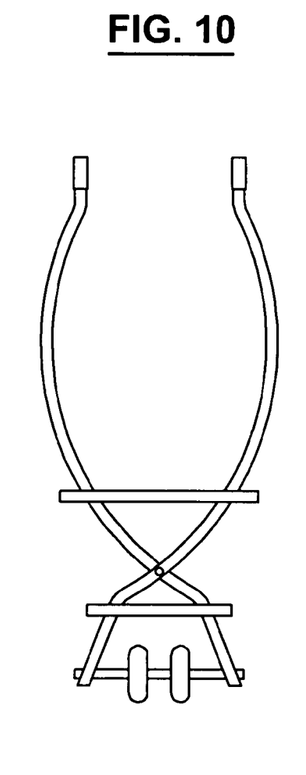

Instead of being straight, the legs of at least one of portions 2, 3 may e.g. be angled, curved, etc. (see the very schematic illustrations of FIGS. 9 and 10).

Figure 11:
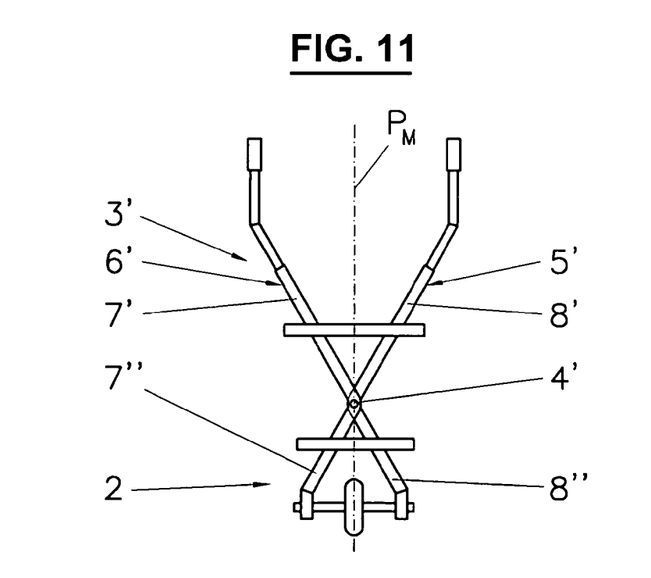
FIG. 11 is a schematic top view of a second embodiment of the transport device.

In a second embodiment shown in FIG. 11, the lower and upper portions 2', 3' are also at least approximately V-shaped, but girders 5', 6' are of a different construction. Thus, each leg of the V of one portion (for example 7'), after converging with the other leg of the same portion (8') to be connected thereto at point 4', opens again on the same side of the median plane passing through line of intersection $P_M$, thus forming leg 7" of the V of lower portion 2'. Analogously, leg 8' converges with leg 7' to be connected thereto and then opens over a section 8". This construction falls into the scope of the invention, but it is less advantageous than the embodiment described above on account of a rigidity of lower quality and a risk of premature wear of the (non-referenced) connecting member provided at 4', this member being exposed to higher (especially torsional) stresses.

Finally, carriage 1 may be provided with a complementary protecting and comfort device 30 (see FIG. 1). In this example, device 30 is composed of a roller that is freewheeling on a shaft (not referenced). The shaft extends under tubes 7 and 8, at the height of cross member 14, and is connected to these elements 7, 8, 14 by fastening means 41. Device 30 is of interest when proceeding in particularly rugged and/or steep terrain, or on stairs, as it allows absorbing the strong irregularities, i.e. avoiding any collisions of the chassis with the ground. In contrast, when the terrain is not or only slightly uneven, this device will not contact it.

Although the most diverse materials can be considered for the manufacture at least of the chassis, it is understood that a material will preferably be chosen which ideally combines mechanical qualities and light weight. As illustrative examples, aluminum, kevlar, glass fibers may be cited, but a synthetic material, wood, bamboo, etc., may also be used.

Figure 12:
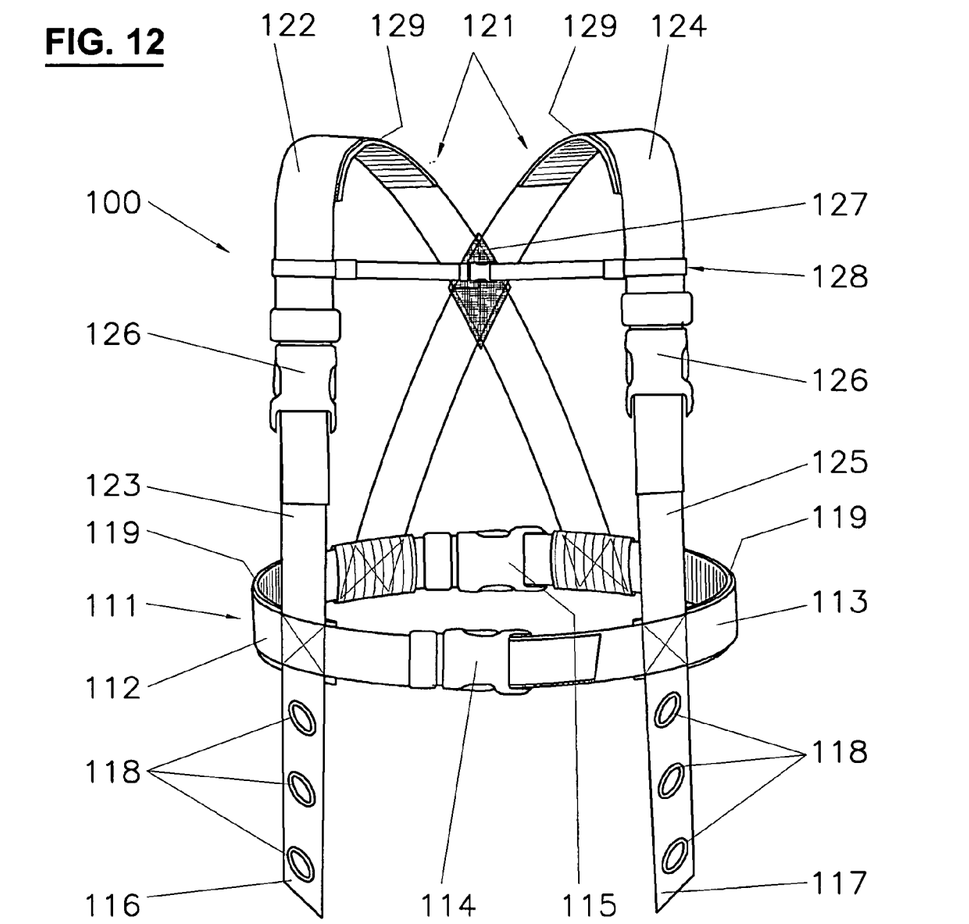
FIG. 12 is a perspective view of a first exemplary embodiment of the attaching device.
Figure 13:
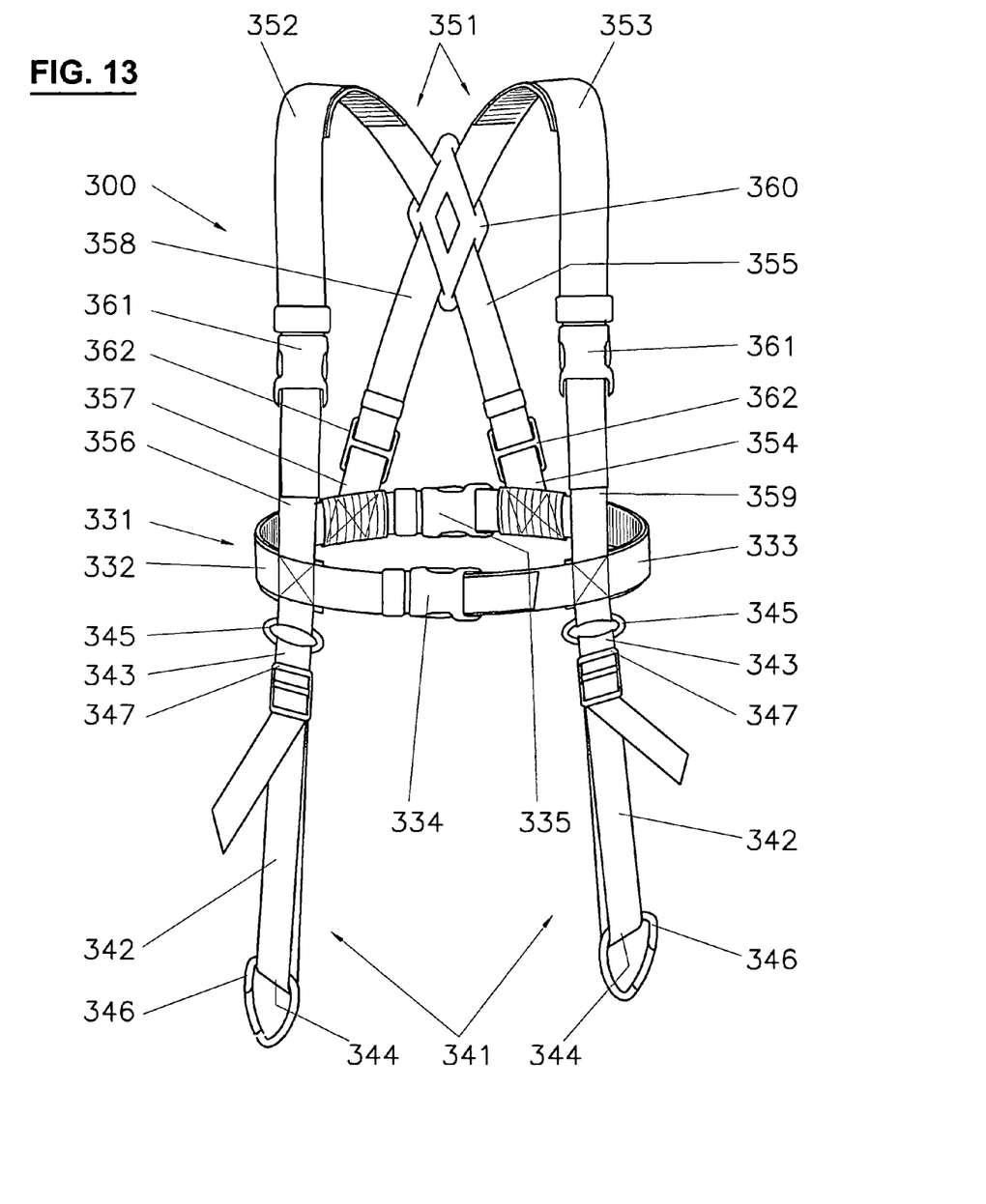
FIG. 13 is a perspective view of a second embodiment of the attaching device.
Figure 14:
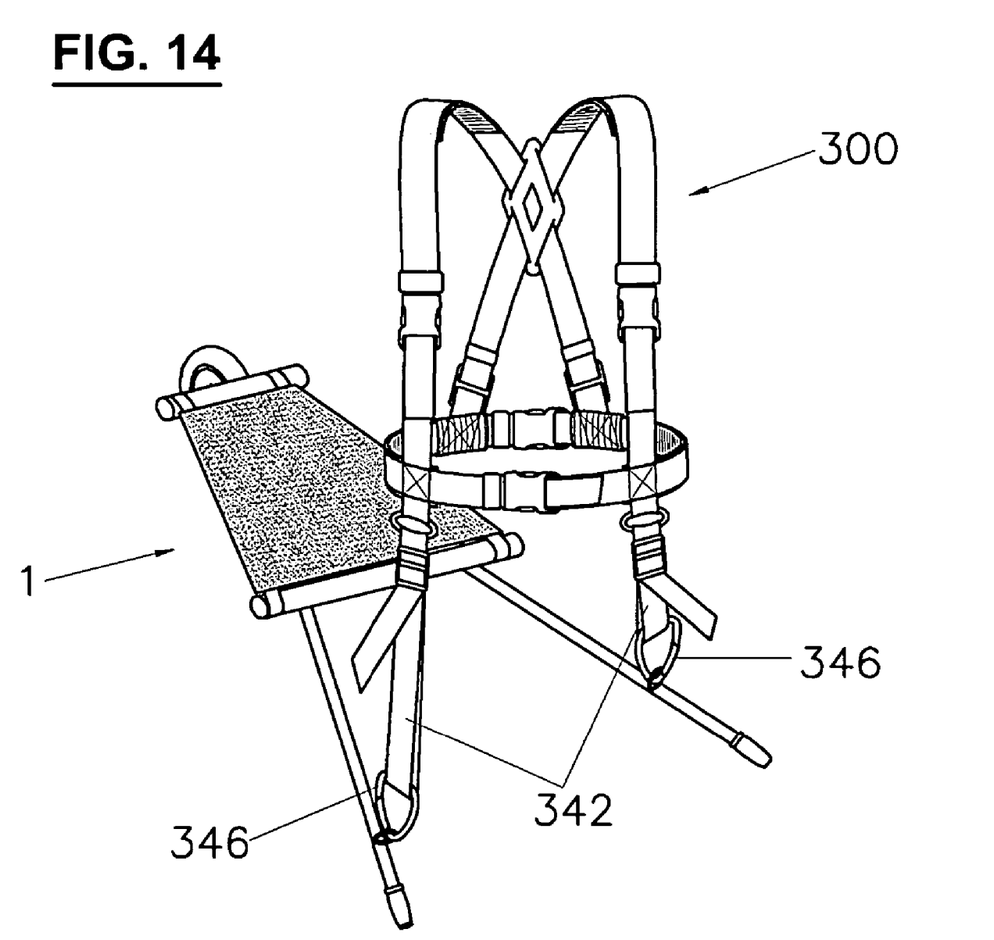
FIG. 14 is a perspective view of an attaching device connected to a transport device.
Figure 16:
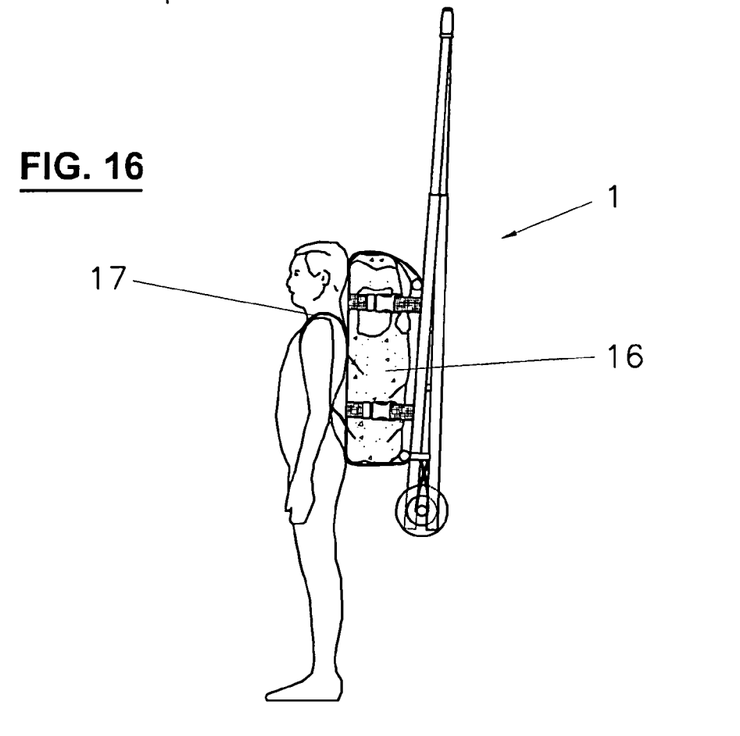
FIG. 16 is a side view of the user carrying the transport device on his back with a load secured thereto, while it will be noted that the scales of the illustrations may differ from one drawing to another and that identical or equivalent elements may be designated by the same reference numerals.

In any case, carriage 1 as described above, and more generally any transport device of the same kind, can be pulled by a carrier by means of an attaching device of which two embodiments are represented in FIGS. 12 and 13 (see also FIGS. 14 through 16). Meanwhile, the carrier may either keep his hands free or, depending on the adjustment that has been effected (see below), place them on handles 11, 12 of carriage 1, or else, in any event, seize the latter instantly and rapidly when the situation requires it, for example due to the relief of the terrain. In fact, the carriage can be connected to the attaching device in such a manner that the handles are placed at a desired height and more or less close to the hands of the carrier with his arms alongside the body (FIG. 15).

Attaching device 100 of the first embodiment represented in FIG. 12 includes a belt 111 comprising a pair of freely pendant lateral straps 116, 117 and which forms a hook-up device. The straps are provided with a series of eyelets 118 disposed at different distances from the belt (and thus at different heights from the ground), each strap comprising e.g. three eyelets in the present example. The belt itself is formed of a right-hand end 112 and of a left-hand end 113 connected to each other at the front and at the back by buckles 114, 115, respectively, the latter allowing a variation of the diameter, i.e. a correct adjustment to the waist measurement of the wearer and a quick fastening with the desired tension. In the example, front buckle 114 is of the known clip-action type with a male portion and a female portion, whereas the rear buckle 115 is of the current double-crosspiece type, one of the crosspieces retaining one of the ends of the belt to fasten it to the buckle and the other crosspiece being surrounded by the other belt end for adjustment to the correct length and tensioning. It is understood that other variants are possible (particularly providing a rear buckle 115 of the same type as buckle 114). Furthermore, in a simplified version, rear buckle 115 might be omitted, thereby obtaining a simple belt that is tensioned and closed on the front side only. However, the twofold adjustment back/front offers the advantage that the user, after having placed belt 111 around the waist, may arrange straps 116, 117 very exactly in the locations he considers ideal. Of course, in principle, a positioning such that the straps are laterally aligned with the femur heads of the carrier (see FIG. 15) seems ideal. Finally, all or part of the inner circumference of belt 111 may be padded. For example, in the embodiment represented in FIG. 12, a padding 119 is provided on the right and on the left side, respectively.

After having correctly placed belt 111 around his waist, the user can hook up carriage 1 to the straps by means of connecting elements, advantageously by spring hooks (not shown in FIG. 12). Thus, after having inserted a spring hook in one of eyelets 118 (as chosen by the user) of each strap 116, 117, each of the two spring hooks will be connected to a corresponding loop provided on the carriage (as appears in FIG. 14).

Furthermore, in a preferred embodiment, a pair of suspenders 121 crossed at the back is connected to belt 111. The straps on the right side are themselves formed by two straps or portions 122, 123 and 124, 125, respectively. In the represented example, these straps are sewn together at their crossing point 127, the belt and suspenders assembly forming a kind of harness that provides a substantial improvement in comfort and efficiency while pulling carriage 1. On the front side, the two portions of each strap can be joined by means of buckles 126 (preferably identical to buckle 114 or of the same type as the latter) allowing an easy adjustment to the morphology of the user and a rapid closure. In a variant, straps 123, 125 might be omitted, in which case it would be convenient to make straps 122, 124 adaptable in length, one of the portions of each buckle 126 (preferably the female portion) being directly connected to the respective end 112, 113 of the belt. Ultimately, all or part of the inner surfaces of suspenders 121, more particularly of straps 122, 124, is preferably padded. For example, in the embodiment represented in FIG. 12, a padding 129 is provided at those locations where the straps are in contact with the shoulders of the user.

According to a variant, a secure retention of straps 122, 124 of the suspenders may be ensured by a transversal chest-strap 128 connecting them to each other. For a quick adjustment and fastening, the chest-strap comprises a non-referenced buckle, preferably in the middle area.

It will be noted that strap 123 and strap 116, on one hand, and strap 125 and strap 117, on the other hand, are connected to belt 111 advantageously in the same area so as to extend in the prolongation of each other.

A second embodiment 300 of the attaching device, shown in FIG. 13, is similar to the first embodiment 100. However, the difference is in certain means that make the application of the device even more practical and more comfortable. Therefore, essentially only these means will be described hereinafter as the reader may refer to the description of embodiment 100 if necessary.

Device 300 is in the form of a harness comprising a belt 331 provided with a hook-up device 341, and a pair of suspenders 351.

The right-hand and the left-hand ends 332, 333 of belt 331 are connected at the front and at the back by buckles 334, 335 which are identical and of the same type as buckle 114 of belt 111 here, thereby allowing for a quicker and easier adjustment and tensioning. Hook-up device 341 is formed of a pair of pendant straps, right and left. Each strap comprises a band 342 fastened by its upper portion 343 to belt 331 through a ring 345, is provided at its lower portion with a loop 344 retaining a spring hook 346 intended to be connected to a ring or any other equivalent means provided on carriage 1, and finally comprises a loop 347 that allows the user to adjust the height position of the spring hook and to maintain the effected adjustment. It is easily understood that this adjustment (in contrast to that of the first embodiment, where the height positions of the spring hook are discrete and dictated by the necessarily limited number of eyelets 118) is continuous within an relatively large interval between a minimum and a maximum height according to the length of band 342, and is consequently perfectly and ideally adaptable to the morphology of the user and/or to the particular requirements of the latter with respect to the positioning of handles 11, 12 of the carriage.

The pair of suspenders 351 comprises to straps 352, 353. Strap 352 is composed of three strap portions 354, 355, 356. Middle strap 355 is connected at the front to strap 356 through a buckle 361 that allows a quick length adjustment and tensioning, and at the back to strap 354 through a buckle 362 that allows length adjustment and tensioning as well. Straps 354, 356 are furthermore connected to belt 331. Strap 353 is composed of three strap portions 357, 358, 359 and is fastened to belt 331 in an analogous manner as just described for strap 352. Straps 352, 353 are crossed at the back while passing through a thin crossing plate 360, thereby eliminating the need of joining them.

Here also, as discussed with reference to embodiment 100, a secure retention of straps 352, 353 may be ensured by a transversal chest-strap 128 (not shown in FIG. 13).

FIG. 14 shows a harness 300, i.e. according to the second embodiment, connected to a carriage 1 (just for illustrative purposes, the adjustments of bands 342 differ substantially from each other, the band on the left being closer to the belt than the band on the right).

The attaching device of the invention, preferably made of a resistant and flexible synthetic material, is light, comfortable to wear and is no handicap for the user. Its adjusting ability makes it ideally adaptable both objectively to any human morphology and subjectively to the preferences of every user. More particularly, FIG. 15 shows that the connecting points of the harness to carriage 1, i.e. the contact points of spring hooks with the connecting loops provided on the carriage, are situated at least approximately in a plane $P_F$ as formed by the axes of right and left femur of the user. The attaching device, which allows the user to be connected to the carriage that advances at the same rhythm as the user, without jerks, the carriage nevertheless having a potential liberty of forward and backward movement with respect to the user while walking, actually forms a harmonious compensating interface (large liberty of movement for the user, ideal distribution of the stresses acting upon the latter, liberty of movement (although limited in the walking axis) of the carriage). Also, the attaching device allows an efficient traction of carriage 1 with its load 16 with maximum ease and effortlessness, the force components—situated partly at the level of the hips of the user and partly at the level of the suspenders, if provided with the attaching device as in the preferred embodiments—do not strain the back of the user, and at the same time it contributes to maintaining the equilibrium of the transport device. Finally it will be noted that the carrier can easily attach the assembly of carriage 1 and load 16 to his back, if required by the surrounding conditions, by means of straps 17 provided on load 16 (FIG. 16).

The invention claimed is:
1. Device for transporting a load, comprising:
a chassis; and
a support element to support the chassis on the ground,
said chassis comprising a lower portion V shape connected, at a connection, to an upper portion V shape,
wherein legs of the lower portion V shape converge, at the connection, to join legs of the upper portion V shape,
wherein the legs of each of said upper and lower portion V shapes, at the connection, extend to open at least over a distance, opposite each other to define an area for placing a load,
wherein a ratio ($H_1/H_2$) of heights of the lower portion V shape and the upper portion V shape, respectively, is equal to a value N,
wherein said support element comprises one of a) a shaft connecting ends of the legs of the lower portion V shape, said shaft disposed in one of i) an alternating manner extending underneath and above said ends and ii) a uniform manner extending either underneath or above said ends, and
b) two shaft portions on a common axis that are projecting on either side of the ends of the legs of the lower portion V shape, said two shaft portions being disposed in one of i) an alternating manner extending respectively underneath and above said ends and ii) a uniform manner extending either underneath or above said ends.

2. The device of claim 1, wherein said chassis is advantageously in the general form of an asymmetrical X with respect to a plane $P_v$ extending orthogonally to said heights $H_1$, $H_2$ and passing through the crossing point of said X, and wherein the ratio N is comprised within an interval of values [0.25–0.35].

3. The device of claim 1, wherein said chassis comprises two longitudinal girders, crossing each other, at the connection, while extending one above or underneath the other, said girders being interconnected by a fastening member at the location of their crossing, and wherein means are provided to ensure a parallelism between the axis of the supporting element of said support device, which is arranged at the ends of the legs of said lower portion V shape, and a straight line connecting the ends of the legs of said upper portion V shape.

4. The device of claim 3, wherein said means ensuring said parallelism are formed of at least one brace.

5. The device of claim 1, wherein said support element further comprises one of a wheel and a ski.

6. The device of claim 3, wherein,
lengths of said two girders are adjustable and variable, and
the legs of said upper portion V shape comprise telescopic members.

7. The device of claim 1, wherein said chassis further comprises at least one cross member disposed on each side of the connection so that there is a cross member associated with each of said lower and upper portions.

8. The device of claim 7, comprising means for ensuring a parallelism of the axes of said cross members.

9. The device of claim 7, wherein said cross members reinforce the chassis and demarcate a seat for the transported load.

10. The device of claim 3, comprising a rack attached to said girders and covering the crossing area of the girders.

11. The device of claim 7, comprising a protecting and absorbing device arranged underneath the lower cross member, said protecting device comprising a roller freewheeling on a shaft.

12. The device of claim 1, further comprising:
an attaching device for connecting a user to the chassis, the attaching device comprising a belt intended to be worn by the user.

13. The device of claim 12, further comprising pendant lateral straps with upper ends connected to said belt.

14. The device of claim 13, wherein said belt is provided with means allowing an adjustment of said straps in determined positions.

15. The device of claim 14, wherein said adjusting means are composed of two buckles.

16. The device of claim 13, wherein said straps comprise means for adjusting an anchorage point to secure the chassis at a selected distance from said belt.

17. The device of claim 16, wherein said means for adjusting the anchorage point are discrete, each strap comprising a series of eyelets for receiving a connecting means.

18. The device of claim 16, wherein said means for adjusting the anchorage point are continuous, each of said straps comprising a loop for adjusting the length thereof and for maintaining that adjustment, the lower end of said strap forming a lug for receiving a connecting means.

19. The device of claim 12, wherein suspenders are connected to said belt so as to form a harness therewith.

20. The device of claim 19, wherein each of the straps of said suspenders comprises at least one means for adjustment to the body and for tensioning.

21. The device of claim 19, wherein said suspender straps are retained at the front by a chest-strap.

22. Device for transporting a load, comprising:
a chassis comprising a V shape lower portion connected, at a connection, to a V shape upper portion,
legs of the lower portion converging, at the connection, to join legs of the upper portion,
the legs of each of said upper and lower portions, at the connection, extending to open at least over a distance, opposite each other to define an area for placing a load;
a support element connected to the chassis and supporting the chassis on the ground;
a cross member disposed on each side of the connection so that there is a lower cross member and an upper cross member associated respectively with each of said lower portion and said upper portion; and
a protecting and absorbing device arranged underneath the lower cross member, said protecting device comprising a roller freewheeling on a shaft.

23. Device for transporting a load, comprising:
a chassis comprising a V shape lower portion connected, at a connecting member, to a V shape upper portion,
legs of the lower portion converging, at the connecting member, to join legs of the upper portion,
the legs of each of said upper and lower portions, at the connecting member, opening opposite each other to define an area for placing a load; and
a support element supporting the chassis on the ground, wherein the support element comprises a shaft connecting ends of the legs of the lower portion, said shaft extending in one of i) an alternating manner underneath one of the ends and above another of the ends and ii) a uniform manner extending either underneath both the ends or above both the ends.

* * * * *